(12) United States Patent
Hm et al.

(10) Patent No.: US 11,074,064 B1
(45) Date of Patent: Jul. 27, 2021

(54) SAFE WINDOW FOR CREATING A FIRMWARE UPDATE PACKAGE

(71) Applicant: Dell Products, L.P., Round Rock, TX (US)

(72) Inventors: Shreedhara Hm, Hassan (IN); Parmeshwr Prasad, Bangalore (IN); Niladri Bhattacharya, Bengaluru (IN); Vaishnavi Kundathi Rajendra, Tumakuru (IN)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/813,941

(22) Filed: Mar. 10, 2020

(51) Int. Cl.
| | |
|---|---|
| G06F 21/57 | (2013.01) |
| H04L 29/06 | (2006.01) |
| G06F 8/65 | (2018.01) |
| G06F 16/901 | (2019.01) |
| G06N 3/08 | (2006.01) |
| G06F 16/35 | (2019.01) |

(52) U.S. Cl.
CPC ............ *G06F 8/65* (2013.01); *G06F 16/9027* (2019.01); *G06N 3/088* (2013.01); *G06F 16/355* (2019.01); *H04L 63/1433* (2013.01)

(58) Field of Classification Search
CPC ...... G06F 8/65; G06F 16/9027; G06F 16/355; G06N 3/088; H04L 63/1433
See application file for complete search history.

(56) References Cited

U.S. PATENT DOCUMENTS

| | | | |
|---|---|---|---|
| 2006/0106743 A1* | 5/2006 | Horvitz | G06N 7/005 706/21 |
| 2008/0229420 A1* | 9/2008 | Jeschke | H04L 63/1433 726/25 |
| 2010/0083386 A1* | 4/2010 | Kline | G01R 31/31705 726/34 |
| 2017/0124487 A1* | 5/2017 | Szeto | G06N 20/00 |
| 2017/0187808 A1* | 6/2017 | Redgate | H04L 63/0272 |
| 2017/0357710 A1* | 12/2017 | Shtossel | G06F 16/355 |
| 2018/0114024 A1* | 4/2018 | Dasari | G06F 21/572 |
| 2019/0080092 A1* | 3/2019 | Lewis | G06F 9/545 |

(Continued)

OTHER PUBLICATIONS

Nidhi Patel et al., Log Files Based Prediction of Failure Types using Deep Learning Models, Jul. 2018, [Retrieved on Mar. 18, 2021]. Retrieved from the internet: <URL: http://117.203.246.91:8080/jspui/handle/10266/5085> 66 Pages (1-66) (Year: 2018).*

*Primary Examiner* — Anibal Rivera
(74) *Attorney, Agent, or Firm* — Fogarty LLP (57) ABSTRACT

Systems and methods are provided for identifying a safe window for creating a firmware update package. In some embodiments, an Information Handling System (IHS), may include a processor and a memory coupled to the processor, the memory having program instructions stored thereon that, upon execution, cause the IHS to: generate tokens based upon a log of historical firmware update package creation events; identify a plurality of workflows based upon the tokens; predict, based upon the plurality of workflows, a future workload of a firmware update package creation service; and indicate, based upon the future workload, a time window for creating a firmware update package using the firmware update package creation service that increases a probability of successful creation.

20 Claims, 4 Drawing Sheets

(56) References Cited

U.S. PATENT DOCUMENTS

| | | | |
|---|---|---|---|
| 2019/0317754 A1* | 10/2019 | Mosquera | G06Q 10/06316 |
| 2020/0162441 A1* | 5/2020 | Kobayashi | H04L 63/108 |
| 2021/0026964 A1* | 1/2021 | Gopal | G06F 21/575 |
| 2021/0056208 A1* | 2/2021 | Gore | G06F 21/572 |

* cited by examiner

SAFE WINDOW FOR CREATING A FIRMWARE UPDATE PACKAGE

FIELD

This disclosure relates generally to Information Handling Systems (IHSs), and more specifically, to systems and methods for identifying a safe window for creating a firmware update package.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

An IHS typically comprises hardware components that utilize firmware instructions. The firmware instructions of a hardware component may be stored in a non-volatile memory that is integral to the hardware component. In various scenarios, firmware utilized by a hardware component may be updated, on occasion, to correct errors and/or improve the performance of the component. In networked environments, for example, firmware may be updated remotely. An IHS administrator or an automated script may push firmware update packages to the IHS's hardware component to initiate a firmware update operation.

In some organizations, a firmware package creation service, application, or tool may be provided for users and administrators to create firmware update packages. Typically, the user uploads metadata, payload inventory and execution (PIE), and/or management update package (MUP) information to the firmware package creation service, and the service creates a firmware update package in a software development environment.

As the inventors hereof have recognized, multiple users may create firmware update packages concurrently. When user(s) request firmware update package creation services simultaneously, however, there are limitations related to the processing of those requests by the software development environment's Application Programming Interface (API). Moreover, should a firmware update package creation request not be complete within a predetermined amount of time, the service fails. This in turn can impact the release schedules, negatively affect customer experience, and/or increase costs to component and IHS manufacturers.

SUMMARY

In an illustrative, non-limiting embodiment, an Information Handling System (IHS), may include a processor and a memory coupled to the processor, the memory having program instructions stored thereon that, upon execution, cause the IHS to: generate tokens based upon a log of historical firmware update package creation events; identify a plurality of workflows based upon the tokens; predict, based upon the plurality of workflows, a future workload of a firmware update package creation service; and indicate, based upon the future workload, a time window for creating a firmware update package using the firmware update package creation service that increases a probability of successful creation.

The log may include one or more operations performed by one or more software applications during an update package creation event and a time stamp for each operation. To identify the plurality of workflows, the program instructions, upon execution, may create a hierarchical tree structure having nodes corresponding to a start and an end of each operation, and edges corresponding to a time taken to complete each respective operation. To predict the future workload, the program instructions, upon execution, may use elements of the hierarchical tree structure as inputs into a neural network. For example, the neural network may include a radial basis function neural network with unsupervised clustering.

The program instructions, upon execution, may predict a workload for each of the software applications and an overall workload of the firmware update package creation service. To indicate the time window, the program instructions, upon execution, may also cause the IHS to arrange the predicted workloads into timelines and to identify the time window as having a lowest predicted aggregate workload. Moreover, the program instructions, upon execution, may further cause the IHS to calculate a difference between the predicted future load with an actual future load and, in response to the different being greater than a threshold value, re-train the neural network.

In another illustrative, non-limiting embodiment, a memory storage device may have program instructions stored thereon that, upon execution by one or more processors of an IHS, cause the IHS to: generate tokens based upon a log of historical firmware update package creation events; identify a plurality of workflows based upon the tokens; predict, based upon the plurality of workflows, a future workload of a firmware update package creation service; and indicate, based upon the future workload, a time window for creating a firmware update package using the firmware update package creation service that increases a probability of successful creation.

In yet another illustrative, non-limiting embodiment, a method may include generating tokens based upon a log of historical firmware update package creation events; identifying a plurality of workflows based upon the tokens; predicting, based upon the plurality of workflows, a future workload of a firmware update package creation service; and indicating, based upon the future workload, a time window for creating a firmware update package using the firmware update package creation service that increases a probability of successful creation.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
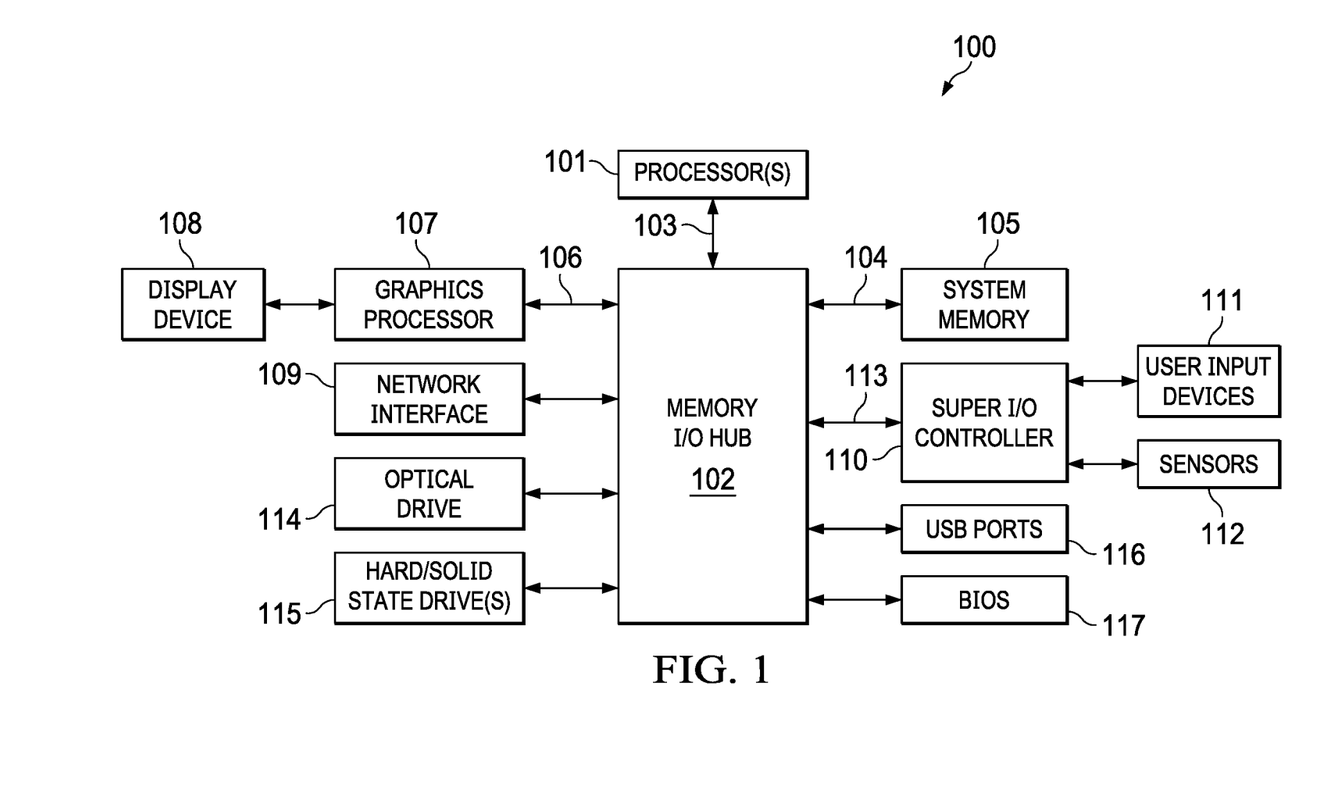
FIG. 1 is a block diagram illustrating an example of an Information Handling System (IHS) configured for identifying a safe window for creating a firmware update package, according to some embodiments.

FIG. 1 shows an example of an IHS configured to implement the systems and methods described herein according to certain embodiments. It should be appreciated that although certain implementations described herein are discussed in the context of a server computer or personal computer (e.g., laptop, desktop, tablets, etc.), other IHS implementations may be utilized. In this example, IHS 100 is configured to identify a safe window for creating a firmware update package, as explained in more detail below.

Particularly, IHS 100 may include one or more processors 101. In various embodiments, IHS 100 may be a single-processor system including one processor 101, or a multi-processor system including two or more processors 101. Processor(s) 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

IHS 100 includes a memory I/O hub chipset 102 comprising one or more integrated circuits that connect to processor(s) 101 over a front-side bus 103. Memory I/O hub 102 provides the processor(s) 101 with access to a variety of resources. For instance, memory I/O hub 102 provides access to system memory 105 over memory bus 104. System memory 105 may be configured to store program instructions and/or data accessible by processors(s) 101. In various embodiments, system memory 105 may be implemented using any suitable memory technology, such as static RAM (SRAM), synchronous dynamic RAM (SDRAM), nonvolatile/Flash-type memory, or any other type of memory.

Memory I/O hub 102 may also provide access to graphics processor 107. In certain embodiments, graphics processor 107 may be comprised within one or more video or graphics cards that have been installed on IHS 100. Graphics processor 107 may be coupled to memory I/O hub 102 via graphics bus 106 such as provided an AGP (Accelerated Graphics Port) bus or a PCI (Peripheral Component Interconnect or) bus. In certain embodiments, graphics processor 107 generates display signals and provides them to coupled display device 108.

In certain embodiments, memory I/O hub 102 may also provide access to one or more user input devices 111. In such embodiments, memory I/O hub 102 may be coupled to a super I/O controller 110 that provides interfaces for variety of user input devices 111, in particular lower bandwidth and low data rate devices. For instance, super I/O controller 110 may provide access to a keyboard and mouse or other peripheral input devices. In certain embodiments, super I/O controller 110 may be used to interface with coupled user input devices 111 such as keypads, biometric scanning devices, and voice or optical recognition devices. In certain embodiments, super I/O controller 110 may also provide an interface for communication with one or more sensor devices 112, which may include environment sensors, such as a temperature sensor or other cooling system sensor. The I/O devices, such as user input devices 111 and sensor devices 112, may interface super I/O controller 110 through wired or wireless connections. In certain embodiments, super I/O controller 110 may be coupled via a Low Pin Count (LPC) bus 113.

Other resources may also be coupled to IHS 100 through memory I/O hub 102. In certain embodiments, memory I/O hub 102 may be coupled to network interface 109, such as provided by a Network Interface Controller (NIC). According to various embodiments, network interface 109 may support communication via various wired and/or wireless networks. Memory I/O hub 102 may also provide access to one or more hard disk and/or solid state drives 115. In certain embodiments, access may be provided to optical drive 114 or other removable-media drive. Any or all of drive devices 114 and 115 may be integral to IHS 100, or may be located remotely from IHS 100. In certain embodiments, access may be provided to one or more Universal Serial Bus (USB) ports 116.

Another resource that may be accessed by processor(s) 101 via memory I/O hub 102 is BIOS 117. The BIOS 117 provides an abstraction layer for interfacing with certain hardware components that are utilized by IHS 100. Via this hardware abstraction layer provided by BIOS 117, the software executed by the processor(s) 101 of IHS is able to interface with certain I/O devices that are coupled to the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI. Upon booting of the IHS 100, processor(s) 101 may utilize BIOS 117 instructions to initialize and test hardware components coupled to the IHS and to load an Operating System (OS) for use by IHS 100.

Sensors 112 may provide access to data describing environmental and operating conditions of IHS 100 (e.g., accelerometers, gyroscopes, hinge sensors, rotation sensors, hall effect sensors, lid sensors, temperature sensors, voltage sensors, current sensors, IR sensors, photosensors, proximity sensors, distance sensors, magnetic sensors, microphones, ultrasonic sensors, etc.).

In some cases, processor(s) 101 may be configured to use context information collected by sensors 112 to determine the relative orientation and movement of IHS 100. For instance, the sensor hub may utilize inertial movement sensors, that may include accelerometer, gyroscope, and magnetometer sensors, and are capable of determining the current orientation and movement of IHS 100 (e.g., IHS 100 is motionless on a relatively flat surface, IHS 100 is being moved irregularly and is likely in transport, the hinge of IHS 100 is oriented in a vertical direction). In certain embodiments, processor(s) 101 may also determine a location and movement of IHS 100 based on triangulation of network signal and based on network information provided by the OS or network interface. In some embodiments, processor(s) 101 may support additional sensors, such as optical, infrared and sonar sensors, that may provide support for xR (virtual, augmented, and/or mixed reality) sessions hosted by IHS 100 and may be used to provide an indication of a user's presence near IHS 100, such as whether a user is present, absent, and/or facing an IHS display.

In cases where an end-user is present before IHS 100, processor(s) 100 may further determine a distance of the end-user from the IHS, where this determination may be made continuously, at periodic intervals, or upon request. The detected or calculated distances may be used by processor(s) 100 to classify the user as being in the IHS's near-field (user's position<threshold distance A), mid-field (threshold distance A<user's position<threshold distance B, where B>A), or far-field (user's position>threshold distance C, where C>B).

In embodiments where IHS 100 may support multiple physical configurations, such as a convertible laptop, N-in-1 device, or the like, processor(s) 100 may utilize one or more mode sensors 112 that collect readings that may be used in determining the current posture in which IHS 100 is physically configured. In certain embodiments, such posture determinations may be additionally made using the movement and orientation information provided by sensors 112.

In laptop and convertible laptop embodiments, for example, processor(s) 100 may utilize a lid position sensor 112 to determine the relative angle between the two panels of the laptop in order to determine the mode in which IHS 100 is physically configured. In such embodiments, lid position sensor 112 may measure the angle of rotation of the hinge that connects the base panel and lid panel of IHS 100. In some cases, processor(s) 100 may collect lid position information, such as the hinge angle, to then use in determining the posture in which IHS 100 is configured.

Processor(s) 100 may determine the posture of IHS 100 based, at least in part, on the angle of rotation of the hinge of IHS 100 from a closed position. A first range of hinge angles from a closed position may indicate a laptop posture, a second range of hinge angles may indicate a landscape posture and a third range of angles may indicate a tablet posture. Processor(s) 100 may additionally utilize orientation and movement information collected from inertial movement sensors 112 to further determine the posture in which IHS 100 is physically configured. For instance, if processor(s) 100 determine that IHS 100 is configured with a hinge angle of a laptop configuration, but IHS 100 is oriented on its side, IHS 100 may be determined to be in a book mode. If IHS 100 is determined to be tilted such that the hinge is oriented between horizontal and vertical, the user's face is detected to be facing the integrated display, and IHS 100 is experiencing slight movement, processor(s) 100 may determine that IHS 100 is being used in a book posture. Processor(s) 100 may determine that IHS 100 is opened to a 180-degree hinge angle and lies on a flat surface, thus indicating that IHS 100 it is being used in a landscape posture. Processor(s) 100 may similarly determine that IHS 100 is in a tent configuration, in response to detecting a hinge angle within a defined range, such as between 300 and 345 degrees, such that the hinge is aligned horizontally and is higher than both display panels of IHS 100.

In some implementations, IHS 100 may not include each of the components shown in FIG. 1. In other implementations, IHS 100 may include other components in addition to those that are shown in FIG. 1. Furthermore, some components that are represented as separate components in FIG. 1 may instead be integrated with other components. For example, all or a portion of the functionality provided by two or more discrete components may instead be provided by components that are integrated into processor(s) 100 as a systems-on-a-chip.

Figure 2:
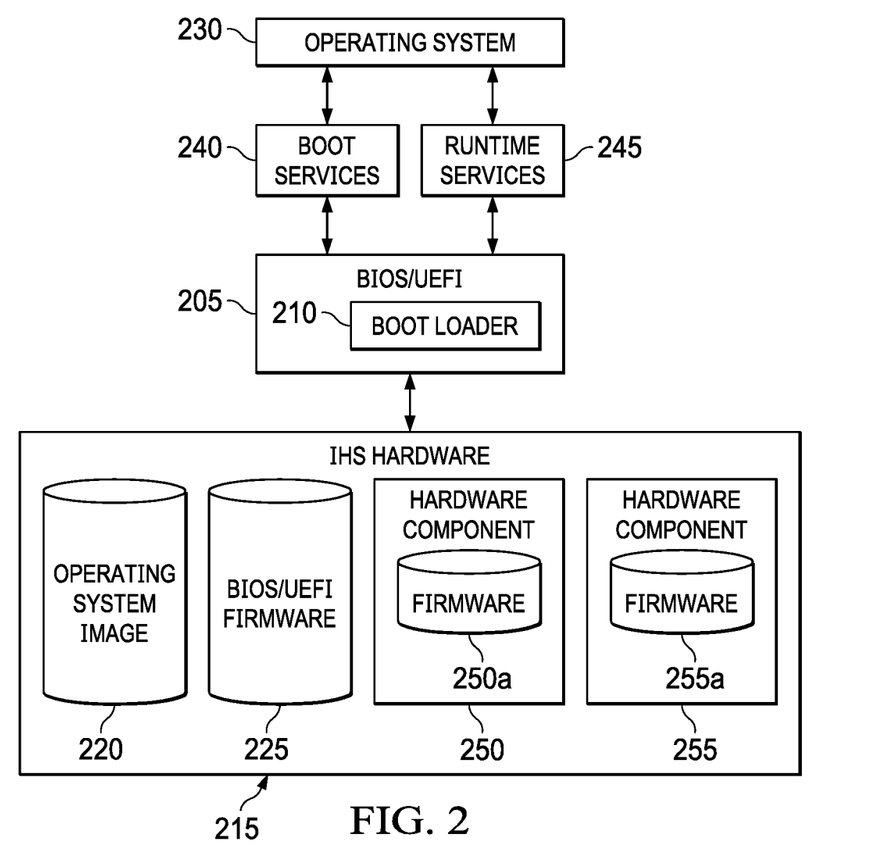
FIG. 2 is a block diagram depicting software and hardware components of an IHS configured for identifying a safe window for creating a firmware update package, according to some embodiments.

FIG. 2 illustrates certain aspects of the operation of BIOS 117 that is described above with respect to the IHS of FIG. 1. In particular FIG. 2 illustrates the initialization and operation of BIOS 205. Upon being powered, an IHS accesses the BIOS firmware 225 that is stored in memory, such as the system memory accessible to the processor(s) of the IHS. BIOS firmware 225 is used by an IHS to initialize BIOS process 205. As described above, the BIOS of an IHS provides instructions that are utilized to interface with certain of the IHS hardware components 215 that are coupled to the IHS. Individual hardware components 215 may be coupled to the IHS via a range of techniques, ranging from fixed integrated circuits to ad hoc wireless connections. In the illustrated example, four hardware components 220, 225, 250, 255 are discussed. Other IHSs may have various other combinations of hardware components.

As described above with respect to FIG. 1, an IHS may utilize a memory I/O hub in order to access various resources, including system memory and one or more storage drives, such as hard disk drives. Upon being initialized, BIOS 205 utilizes a boot loader 210 that is configured to identify and boot an operating system for use by the IHS. The boot loader 210 utilizes the memory I/O hub to access an operating system image 220 that is stored in a storage device, such as a hard disk drive, that is coupled to the IHS. In certain scenarios, the boot loader 210 may be configured to load only certain modules of the operating system image 220. In certain scenarios, the boot loader 210 may also initialize a boot services process 240 that is configured to provide the basic I/O and file operations that are needed to boot the operating system 230.

Once operating system 230 is booted and properly configured to interface with the IHS hardware components 215, BIOS 205 may be configured to transition from the use of boot services 240 used during booting to runtime services 245 that are configured to provide instructions for I/O and file operations to be utilized by the booted operating system 230. In certain scenarios, various combinations of EFI and BIOS modules may be present in the BIOS 205. In such scenarios, an IHS may support various combinations features from of each of the EFI and BIOS firmware interfaces.

Referring back to FIG. 2, two additional hardware components 250 and 255 are illustrated. Each of these two hardware components 250 and 255 include integral memory devices that are used to store firmware 250a and 255a that is configured to allow each of the respective hardware components 250 and 255 to interface with the operating system 230. Moreover, the firmware for the hardware components 250a and 255a, as well as the firmware for BIOS 225, may be occasionally updated with instructions contained in one or more firmware update packages, which may be received, for example, from a firmware update package creation service over a network (i.e., a remote server executing a software application configured to produce firmware update packets).

Figure 3:
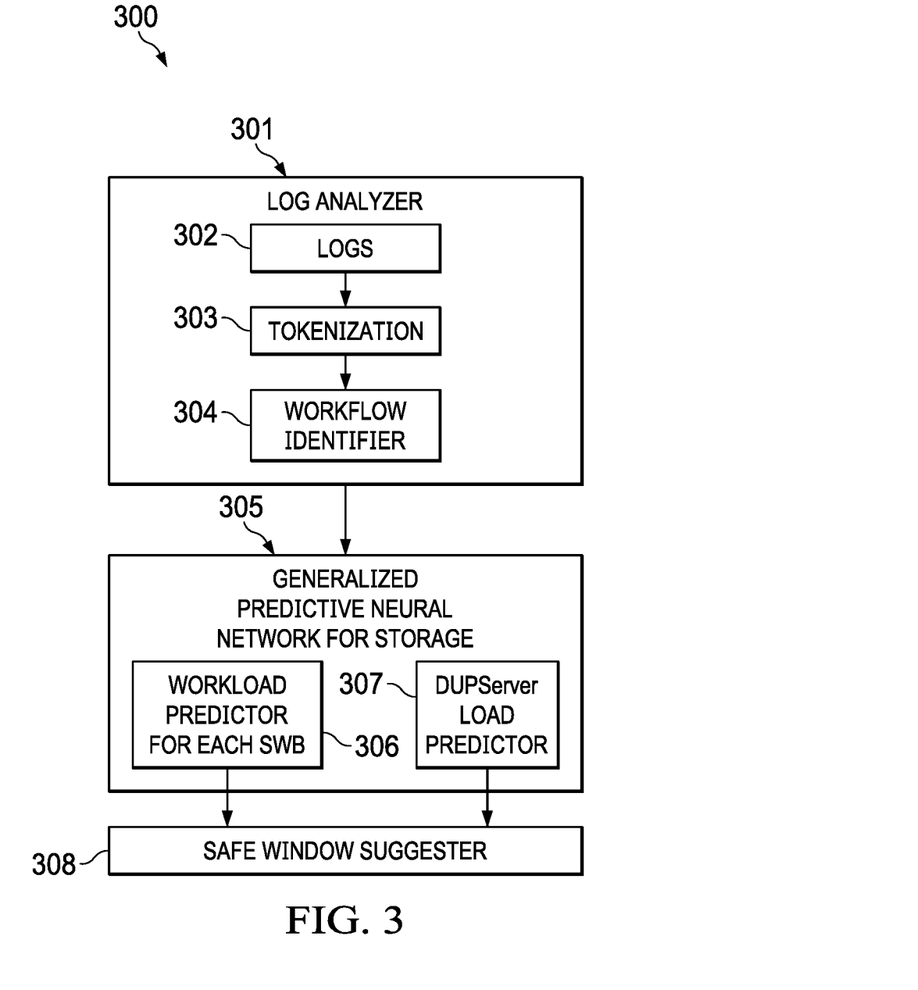
FIG. 3 is a flowchart of an example of an overall method for identifying a safe window for creating a firmware update package, according to some embodiments.

FIG. 3 is a flowchart of an example of an overall method 300 for identifying a safe window for creating a firmware update package. In some embodiments, method 300 may be performed by processor(s) 101 of IHS 100 in response to the execution of program instructions stored in memory 105. Generally, method 300 may be used to identify and/or prompt a user about a safe window in which the success of the DUP creation is highest.

At block 302, log analyzer 301 receives historical logs of the success and failure scenarios for firmware update package creation attempts. Block 302 may maintain an extensive log of operations performed for a particular software application and/or bundle under execution. For example, a log may contain the date and time stamps for the different operations executed, and their corresponding status (e.g., success or failure) for a particular software application or bundle.

Then, block 303 generates tokens pertaining to each respective software application and/or bundle with corresponding time-date stamps. Tokenization block 303 may perform tokenization operations based on predefined position(s) in the logs to extract information (e.g., identity, commands, responses, etc.) about and/or from the software application or bundle.

Block 304 arranges the operations performed for a given software application or bundle in a tree structure with nodes being the start and end of an operation and the edges defining the time taken to complete each operation. For each software application or bundle, between two nodes may be multiple edges for each date stamp. The workflow path(s) identified with the time taken and the date of the week are passed on to prediction module 305.

Predictor block 305 includes a two-way workload predictor for each software application and/or bundle 306, typically local services, as well as "DUPserver" load predictor 307 for the overall workload of the firmware update package creation service, typically a remote service. Generally, the previously formed tree structure may be the input into predictor 305. Predictor 305 may use would a Radial Basis Function Neural network, or the like, with an unsupervised clustering technique. Particularly, historical data available may be used to train a Generalized Predictive Neural Network for Storage (GPNNS) prediction algorithm, for each separate software application and/or bundle, and also for an aggregate of all the firmware update package created.

The clustering algorithm may use density-based spatial clustering of applications with noise. It should be noted that a conventional radial basis function would ordinarily involve K-means (or others with predetermined cluster number), but unsupervised clustering does not require any such assumptions, as the cluster number is determined on-the-fly, which makes the algorithm more robust and fault tolerant.

In some cases, a prediction may be made for the following 30 calendar days. The error between the predicted and actual individual software application or bundle and the overall creation service may be calculated every calendar week, and if the value of the error is above a selected threshold, the model may be retrained including the new data. If the error is within limits, the same model is continued.

Figure 4:
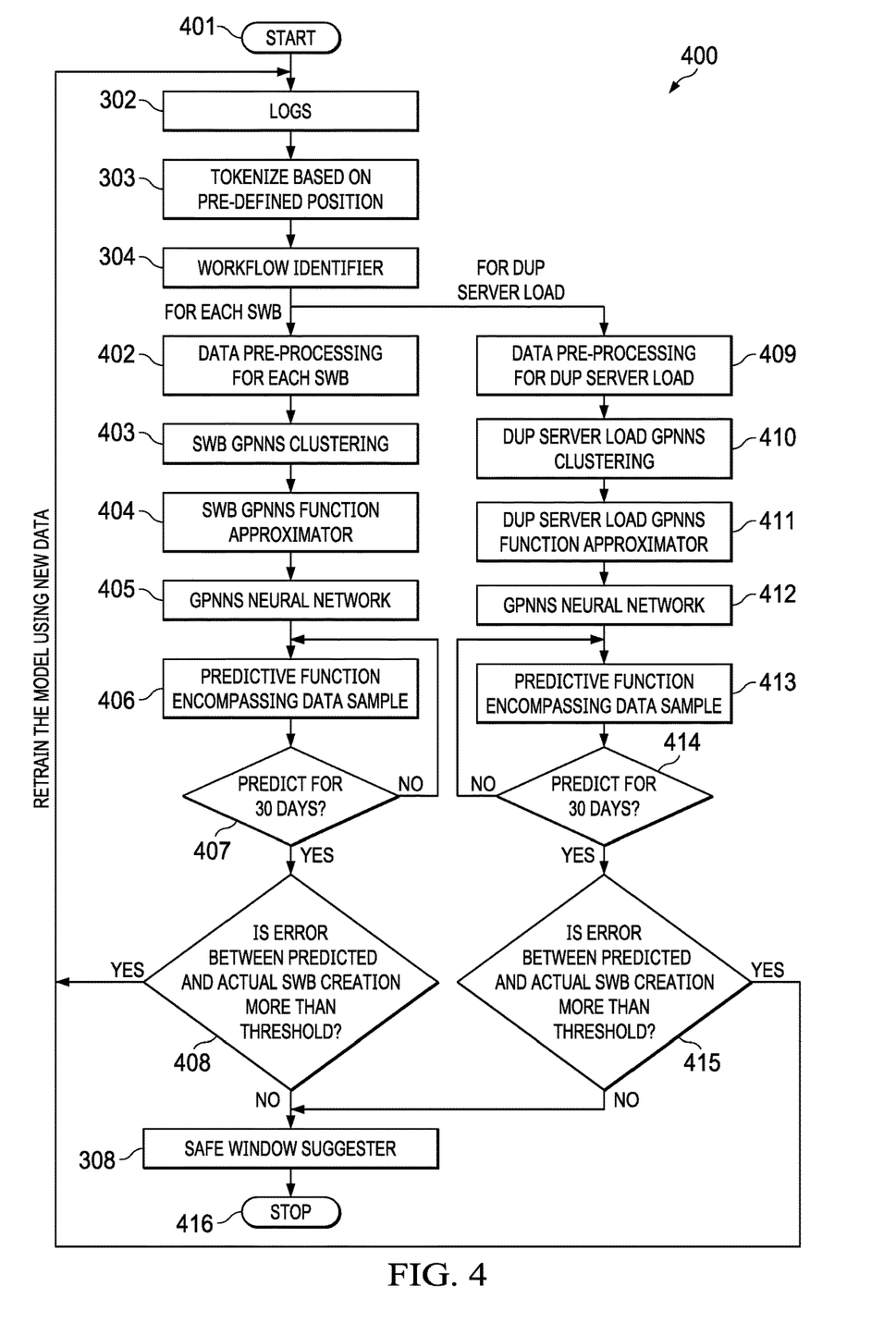
FIG. 4 is a flowchart of an example of a detailed method for identifying a safe window for creating a firmware update package, according to some embodiments.

Safe window suggester 308 takes the prediction(s) of the predictor block 305's creation timelines for each software application and/or bundle and also the overall firmware update package creation service as input. Timelines may be arranged to find time periods which have relatively low workload and the suggestions are made accordingly. The suggestion(s) at the output of method 300 may take previous historical data into consideration for all continuing products, and provide similar timelines. For new additions, vacancies may be utilized depending upon their work pattern(s). As such, safe window suggester 308 may receive predictions from the previous layer and provide the user with a slot that increases or maximizes the probability of a successful firmware update package creation, as well as the balancing of the workload on the creation service and proper utilization of the resources FIG. 4 is a flowchart of an example of a detailed method for identifying a safe window for creating a firmware update package. In some embodiments, method 400 may be performed by processor(s) 101 of IHS 100 in response to the execution of program instructions stored in memory 105. Particularly, method 400 starts at block 401 and ends at block 416. Blocks 302-304 and 308 are as described above with respect to FIG. 3, block 306 is expanded into blocks 402-408, and block 307 is expanded into blocks 409-415.

At block 402, method 400 may perform data pre-processing operations for each software application and/or bundle. At block 403, method 400 may perform GPNNS clustering for each software application and/or bundle. At block 404, method 400 may apply a GPNNS a function approximator to the clustered data. Then, at block 405, method 400 may use the approximated data as inputs into the GPNNS neural network. At block 406, method 400 may apply a predictive function encompassing data samples. At block 407, if the prediction is selected for a period of time (e.g., 30 days), control passes to block 408, otherwise control returns to block 406. A block 408, if an error or difference between the predicted and actual creation data is greater than an empirically selected threshold, control returns to block 302 to re-train the network. Otherwise, control passes to block 308.

At block 409, method 400 may perform data pre-processing operations for workloads executed by a firmware update package creation service. At block 410, method 400 may perform GPNNS clustering for the firmware update package creation service workloads. At block 411, method 400 may apply a GPNNS a function approximator to the clustered data. Then, at block 412, method 400 may use the approximated data as inputs into the GPNNS neural network. At block 413, method 400 may apply a predictive function encompassing data samples. At block 414, if the prediction is selected for a period of time (e.g., 30 days), control passes to block 415, otherwise control returns to block 413. A block 414, if an error or difference between the predicted and actual creation data is greater than an empirically selected threshold, control returns to block 302 to re-train the network. Otherwise, control passes to block 308.

In some cases, selection or suggestion of a time window for creating a firmware update package with the firmware update creation service may be based upon context information obtained by sensors 112. As such, the neural network may take such context information into account as input(s), along with other application or bundle information. For example, if the user is in the near-field during execution of a workload, the predicted time duration for the workload may be multiplied by a first weight or factor, if the user is in the mid-field during execution of the workload, the predicted time duration for the workload may be multiplied by a second weight or factor, or if the user is in the far-field during execution of the workload, the predicted time duration for the workload may be multiplied by a third weight or factor. Moreover, whether IHS 100 is a given posture, with a lid open or closed, and/or a first range of hinge angles during execution of each a workload may also cause the predicted time duration for that workload to be multiplied by a different, empirically determined weight or factor.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
   a processor; and
   a memory coupled to the processor, the memory having program instructions stored thereon that, upon execution, cause the IHS to:
   generate tokens based upon a log of historical firmware update package creation events;
   identify a plurality of workflows based upon the tokens;
   predict, based upon the plurality of workflows, a future workload of a firmware update package creation service; and
   indicate, based upon the future workload, a time window for creating a firmware update package using the firmware update package creation service that increases a probability of successful creation.

2. The IHS of claim 1, wherein the log comprises one or more operations performed by one or more software applications during an update package creation event and a time stamp for each operation.

3. The IHS of claim 2, wherein to identify the plurality of workflows, the program instructions, upon execution, cause the IHS to create a hierarchical tree structure having nodes corresponding to a start and an end of each operation, and edges corresponding to a time taken to complete each respective operation.

4. The IHS of claim 3, wherein to predict the future workload, the program instructions, upon execution, cause the IHS to use elements of the hierarchical tree structure as inputs into a neural network.

5. The IHS of claim 4, wherein the neural network comprises a radial basis function neural network with unsupervised clustering.

6. The IHS of claim 4, wherein the program instructions, upon execution, further cause the IHS to predict a workload for each of the software applications and an overall workload of the firmware update package creation service.

7. The IHS of claim 6, wherein to indicate the time window, the program instructions, upon execution, further cause the IHS to arrange the predicted workloads into timelines and to identify the time window as having a lowest predicted aggregate workload.

8. The IHS of claim 1, wherein the program instructions, upon execution, further cause the IHS to calculate a difference between the predicted future load with an actual future load and, in response to the difference being greater than a threshold value, re-train the neural network.

9. A memory storage device having program instructions stored thereon that, upon execution by one or more processors of an Information Handling System (IHS), cause the IHS to:
   generate tokens based upon a log of historical firmware update package creation events;
   identify a plurality of workflows based upon the tokens;
   predict, based upon the plurality of workflows, a future workload of a firmware update package creation service; and
   indicate, based upon the future workload, a time window for creating a firmware update package using the firmware update package creation service that increases a probability of successful creation.

10. The memory storage device of claim 9, wherein the log comprises one or more operations performed by one or more software applications during an update package creation event and a time stamp for each operation.

11. The memory storage device of claim 10, wherein to identify the plurality of workflows, the program instructions, upon execution, cause the IHS to create a hierarchical tree structure having nodes corresponding to a start and an end of each operation, and edges corresponding to a time taken to complete each respective operation.

12. The memory storage device of claim 11, wherein to predict the future workload, the program instructions, upon execution, cause the IHS to use elements of the hierarchical tree structure as inputs into a neural network.

13. The memory storage device of claim 12, wherein the program instructions, upon execution, cause the IHS to predict a workload for each of the software applications and an overall workload of the firmware update package creation service.

14. The memory storage device of claim 13, wherein to indicate the time window, the program instructions, upon execution, further cause the IHS to arrange the predicted workloads into timelines and to identify the time window as having a lowest predicted aggregate workload.

15. A method, comprising:
generating tokens based upon a log of historical firmware update package creation events;
identifying a plurality of workflows based upon the tokens;
predicting, based upon the plurality of workflows, a future workload of a firmware update package creation service; and
indicating, based upon the future workload, a time window for creating a firmware update package using the firmware update package creation service that increases a probability of successful creation.

16. The method of claim 15, wherein the log comprises one or more operations performed by one or more software applications during an update package creation event and a time stamp for each operation.

17. The method of claim 16, wherein identifying the plurality of workflows, comprises creating a hierarchical tree structure having nodes corresponding to a start and an end of each operation, and edges corresponding to a time taken to complete each respective operation.

18. The method of claim 17, wherein predicting the future workload comprises using elements of the hierarchical tree structure as inputs into a neural network.

19. The method of claim 18, further comprising predicting a workload for each of the software applications and an overall workload of the firmware update package creation service.

20. The method of claim 19, wherein indicating the time window comprises arranging the predicted workloads into timelines and to identify the time window as having a lowest predicted aggregate workload.

* * * * *